US011627481B2

(12) United States Patent
Chino et al.

(10) Patent No.: US 11,627,481 B2
(45) Date of Patent: Apr. 11, 2023

(54) MOBILE TERMINAL TEST DEVICE AND MOBILE TERMINAL TEST METHOD

(71) Applicant: ANRITSU CORPORATION, Atsugi (JP)

(72) Inventors: Shunsuke Chino, Atsugi (JP); Tsuyoshi Sato, Atsugi (JP); Takuma Goto, Atsugi (JP); Ryoji Yamamoto, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 20 days.

(21) Appl. No.: 17/220,429

(22) Filed: Apr. 1, 2021

(65) Prior Publication Data

US 2021/0321273 A1 Oct. 14, 2021

(30) Foreign Application Priority Data

Apr. 10, 2020 (JP) .............................. JP2020-070970

(51) Int. Cl.
*H04W 24/06* (2009.01)
*H04W 8/08* (2009.01)
*H04W 8/24* (2009.01)

(52) U.S. Cl.
CPC ............. *H04W 24/06* (2013.01); *H04W 8/08* (2013.01); *H04W 8/24* (2013.01)

(58) Field of Classification Search
CPC .......... H04W 24/06; H04W 8/08; H04W 8/24
See application file for complete search history.

(56) References Cited

U.S. PATENT DOCUMENTS

| 2011/0106339 | A1* | 5/2011 | Phillips | G05D 1/0033 701/2 |
| 2014/0293818 | A1* | 10/2014 | Sesia | H04B 17/318 370/252 |
| 2017/0371773 | A1* | 12/2017 | Gentile | G06F 11/3688 |
| 2021/0112146 | A1* | 4/2021 | Sevindik | H04L 67/34 |

FOREIGN PATENT DOCUMENTS

| JP | 2018201067 A | 12/2018 |
| JP | 2019036920 A | 3/2019 |
| JP | 6576389 B2 | 9/2019 |

* cited by examiner

*Primary Examiner* — Jianye Wu
(74) *Attorney, Agent, or Firm* — Greer Burns & Crain Ltd.

(57) ABSTRACT

To provide a mobile communication terminal test device and a mobile terminal test method capable of easily generating test cases for a mobile communication terminal supporting 5G NR at low cost without omissions. Provided is a mobile terminal test device 1 that tests a mobile communication terminal 2 by simulating a mobile communication base station, the mobile terminal test device including: an acquisition unit (141) that acquires terminal capability information, which is information related to a capability of the mobile communication terminal, by communicating with the mobile communication terminal; an extraction unit (142) that extracts first capability information related to a first wireless communication method from the terminal capability information; and a generation unit (144) that generates a test case as a combination (210) of parameter setting values to be set in test parameters in the first wireless communication method, based on the first capability information.

7 Claims, 6 Drawing Sheets

| NR | | | | | | | | | | E-UTRA | | | | | | | | | |
|---|---|---|---|---|---|---|---|---|---|---|---|---|---|---|---|---|---|---|---|
| Number of CCs | | Number of bands | | CA Configuration | | bandwidth | Total bandwidth | | MIMO | | SCS | Number of CCs | | Number of bands | | CA Configuration | | bandwidth | Total bandwidth | | band | MIMO | |
| DL | UL | DL | UL | DL | UL | DL/UL | DL | UL | DL | UL | DL/UL | DL | UL | DL | UL | DL | UL | DL/UL | DL | UL | DL/UL | DL | UL |
| 2 | 1 | 1 | 1 | n77C | n77A | 20 | 40 | 20 | 1x1 | 1x1 | 30kHz | 4 | 1 | 4 | 1 | 1A-3A-19A-21A | 1A | 5 | 80 | 20 | 1 | 1x1 | 1x1 |
| 2 | 1 | 1 | 1 | n77C | n77A | 20 | 40 | 20 | 2x2 | 1x1 | 30kHz | 4 | 1 | 4 | 1 | 1A-3A-19A-21A | 1A | 10 | 80 | 20 | 3 | 2x2 | 1x1 |
| 2 | 1 | 1 | 1 | n77C | n77A | 20 | 40 | 20 | 4x4 | 1x1 | 30kHz | 4 | 1 | 4 | 1 | 1A-3A-19A-21A | 1A | 15 | 80 | 20 | 19 | 4x4 | 1x1 |
| 2 | 1 | 1 | 1 | n77C | n77A | 20 | 40 | 20 | | 1x1 | 30kHz | 4 | 1 | 4 | 1 | 1A-3A-19A-21A | 1A | 20 | 80 | 20 | 21 | | 1x1 |
| 2 | 1 | 1 | 1 | n77C | n77A | 100 | 200 | 100 | 1x1 | 1x1 | 30kHz | 4 | 1 | 4 | 1 | 1A-3A-19A-21A | 1A | | 80 | 20 | n77 | | 1x1 |

| Target Mobility Action |
|---|
| inter gNB Handover from NR Base Station to NR Base Station. |
| Handover from NR Base Station to Other System (2G/3G/4G) Base Station. SA, NSA Included. |
| Handover from NR Base Station to NR Base Station During E-UTRA-NR Duel Connectivity (NSA Time) |

FIG.4A

| intra-frequency, inter-frequency and inter-RAT Mobility Action Triggered by Measurement |
|---|
| Event B1 (Inter RAT neighbour becomes better than threshold) |
| Event B2 (PCell becomes worse than threshold1 and inter RAT neighbour becomes better than threshold2) |
| Event A1 (Serving becomes better than threshold) |
| Event A2 (Serving becomes worse than threshold) |
| Event A3 (Neighbour becomes offset better than SpCell) |
| Event A4 (Neighbour becomes better than threshold) |
| Event A5 (SpCell becomes worse than threshold1 and neighbour/SCell becomes better than threshold2) |
| Event A6 (Neighbour becomes offset better than SCell) |

FIG.4B

MOBILE TERMINAL TEST DEVICE AND MOBILE TERMINAL TEST METHOD

CROSS-REFERENCE TO RELATED APPLICATIONS

This application claims Convention priority to Japanese Patent Application No. 2020-070970, filed Apr. 10, 2020, the entire contents of which are incorporated herein by reference.

FIELD OF THE INVENTION

The present invention relates to a mobile terminal test device to test a mobile communication terminal and a mobile terminal test method.

BACKGROUND ART

When a mobile communication terminal such as a mobile phone, a data communication terminal, or an in-vehicle communication terminal is developed, it is necessary to test whether or not the developed mobile communication terminal can communicate normally. Therefore, such a test is performed in which a mobile communication terminal to be tested is connected to a test device that operates as a pseudo base station that simulates the function of an actual base station, and communication is performed between the test device and the mobile communication terminal, and confirm the content of the communication.

In addition, in the 3GPP (3rd Generation Partnership Project), which establishes communication standards for wireless communication, carrier aggregation (Carrier Aggregation) technology and MIMO (Multiple-Input and Multiple-Output) technology and the like are introduced among 5G NR (New Radio). For example, this carrier aggregation aims to improve the transmission speed by simultaneously using a plurality of carriers of 5G for communication.

In carrier aggregation, communication is performed using a plurality of 5G NR carriers called component carriers (hereinafter, also referred to as CC). In carrier aggregation, communication is performed by one primary component carrier, which is the CC required for the mobile communication terminal to maintain the connection with the base station, and one or more secondary component carriers that are CCs used to improve the transmission speed between the mobile communication terminal and the base station.

Patent Document 1 disclose a mobile terminal test device that facilitates a setting of a combination of frequency bands by displaying a list of combinations of carrier aggregation frequency bands and having the user select the combination from the list, when testing a mobile communication terminal compatible with LTE (Long Term Evolution).

CITATION LIST

Patent Literature

Patent Document 1: Japanese Patent No. 6576389

SUMMARY OF THE INVENTION

Technical Problem

With the sophistication of 5G NR, parameters (also called test parameters) such as frequency band, bandwidth, CC number, and MIMO order supported by mobile communication terminals are steadily increasing, so that the number of the operation patterns combining these parameters reaches tens of thousands of ways.

When testing a mobile communication terminal, the user needs to prepare in advance a "test case" that is a combination of test parameter setting values (also called parameter setting values). As the number of test parameters increases, the number of test cases to be prepared as well as the operation pattern has increased dramatically.

In addition, there are multiple types of tests such as throughput test and cell mobility test, and the user needs to prepare test cases based on the configuration of various test parameters according to the type of test.

Furthermore, there are two types of 5G NR operation modes: non-standalone (NSA) mode and standalone (SA) mode. The NSA mode is an operation mode in which a 5G NR wireless communication method and an LTE/LTE-A (Long Term Evolution-Advanced) communication method are used in combination. The SA mode is an operation mode in which 5G NR alone performs control from control between a base station and a mobile communication terminal to data transmission/reception. The configuration of test parameters changes according to the difference in operation mode, which also contributes to the increase in the number of test cases.

In such a situation where test parameters increase including the operation form and test type, it is necessary to comprehensively test and evaluate all patterns of combinations of these test parameters from the viewpoint of software regression, thus obliging the users to spend a great deal of effort and a great deal of development cost for preparing test cases. Further, as the number of test cases to be prepared increases, it is becoming more likely that a leak or an error of test cases occur due to mistakes of the user.

The present invention has been made to solve such a conventional problem, and it is the object of the present invention to provide a mobile communication terminal test device and a mobile terminal test method capable of easily generating test cases for a mobile communication terminal supporting 5G NR at low cost without omissions.

Means to Solve Problems

In order to solve the above problems, the mobile terminal test device according to the present invention is a mobile terminal test device (1) that tests a mobile communication terminal (2) by simulating a mobile communication base station, the mobile terminal test device comprising: an acquisition unit (141) that acquires terminal capability information, which is information related to a capability of the mobile communication terminal, by communicating with the mobile communication terminal; an extraction unit (142) that extracts first capability information related to a first wireless communication method from the terminal capability information; and a generation unit (144) that generates a test case as a combination (210) of parameter setting values to be set in test parameters in the first wireless communication method, based on the first capability information.

As described above, in the mobile terminal test device according to the present invention, the extraction unit extracts the first capability information related to the first wireless communication method from the capability information of the mobile communication terminal, and the generation unit generates a test case as a combination of parameter setting values to be set in test parameters in the first wireless communication method, based on the first capability information. By this configuration, it is possible to easily generate all the test cases without omissions for various types of tests, in an operation mode (standalone) in which control and data transmission/reception between a base station and a mobile communication terminal are performed by the first wireless communication method alone.

Further, in the mobile terminal test device of the present invention, the extraction unit further extracts second capability information related to a second wireless communication method, the generation unit further generates a test case as a combination of: the combination (210) of parameter setting values to be set in the test parameters in the first wireless communication method; and a combination (220) of parameter setting values to be set in test parameters in the second wireless communication method based on the second capability information.

By this configuration, the mobile terminal test device according to the present invention can easily generate all test cases generated without omissions for various types of tests in the operation mode (non-standalone) that uses the first wireless communication method and the second wireless communication method, so that various types of tests can be performed quickly and reliably at low cost.

Further, the mobile terminal test device of the present invention may be further provided with a list generation unit (145) that generates a list of execution order of the test cases generated by the generation unit, and a display unit (12) that displays the list together with execution result of the test cases.

By this configuration, the mobile terminal test device according to the present invention allows the user to easily confirm the executed test cases and the test results in the execution order.

Further, the mobile terminal test device of the present invention may be further provided with a determination unit (143) that determines whether or not the terminal capability information of the mobile communication terminal is correct, based on whether or not either one of the first capability information or the second capability information extracted by the extraction unit conforms to a predetermined criterion.

By this configuration, the mobile terminal test device according to the present invention can detect the error of the information itself of the terminal capability information (UE Capability Information) installed in the mobile communication terminal.

Further, in the mobile terminal test device of the present invention, either one of the first capability information or the second capability information extracted by the extraction unit includes capability information related to throughput, and the test case generated by the generation unit includes parameter setting values to be set in test parameters related to throughput.

By this configuration, the mobile terminal test device according to the present invention can easily generate all test cases without omissions in the throughput test for testing the communication speed of the mobile communication terminal.

In addition, in the mobile terminal test device of the present invention, either one of the first capability information or the second capability information extracted by the extraction unit includes capability information related to mobility, and the test case generated by the generation unit includes parameter setting values to be set in test parameters related to mobility.

By this configuration, the mobile terminal test device according to the present invention can easily generate all test cases without omissions, regarding various types of handover such as inter frequency hand over, inter system handover, and the like.

Further, in the mobile terminal test device of the present invention, the first wireless communication method may be a 5G NR (New Radio) communication method, and the second wireless communication method may be a LTE (Long Term Evolution) or LTE-A (Long Term Evolution Advanced) communication method.

By this configuration, the mobile terminal test device according to the present invention can execute various tests effectively and at low cost in an operation mode (non-standalone) in which a 5G NR communication method and an LTE communication method are used in combination.

Further, the mobile terminal test method of the present invention is a mobile terminal test method that tests a mobile communication terminal (2) by simulating a mobile communication base station, the method comprising: an acquisition step to acquire terminal capability information, which is information related to a capability of the mobile communication terminal, by communicating with the mobile communication terminal; an extraction step to respectively extract first capability information related to a first wireless communication method and second capability information related to a second wireless communication method, from the terminal capability information; a generation step to generate a test case as a combination of a combination (210) of parameter setting values to be set in test parameters in the first wireless communication method and a combination (220) of parameter setting values to be set in test parameters in the second wireless communication method, based on the first capability information and the second capability information; and an execution step to sequentially execute the test cases.

As described above, in the mobile terminal test method according to the present invention, the first capability information related to the first wireless communication method and the second capability information related to the second wireless communication method are respectively extracted from the terminal capability information of the mobile communication terminal in the extraction step, and the test case is generated as a combination of a combination of the parameter setting values to be set in the test parameters in the first wireless communication method and a combination of the parameter setting values to be set in the test parameters in the second wireless communication method, based on the first capability information and the second capability information, in the generation step. By this configuration, it is possible to easily generate all test cases generated without omissions for various types of tests in the operation mode (non-standalone) that uses the first wireless communication method and the second wireless communication method, so that various types of tests can be performed quickly and reliably at low cost.

Effect of the Invention

According to the present invention, it is possible to provide a mobile terminal test device and a mobile terminal test method capable of easily generating test cases for a mobile communication terminal supporting 5G NR without omissions at low cost.

BRIEF DESCRIPTION OF DRAWINGS

FIG. 3 is a figure showing an example of the combination of parameter setting values (test case) of a throughput test of the mobile terminal test device according to an embodiment of the present invention.

FIGS. 4A and 4B are figures showing an example of parameter setting values of a cell mobility test of the mobile terminal test device according to an embodiment of the present invention. FIG. 4A is a figure showing the mobility (handover) operation to be tested. FIG. 4B is a figure showing the intra-frequency, inter-frequency, and inter-RAT mobility operations triggered by Measurement.

DETAILED DESCRIPTION OF EMBODIMENTS

Hereinafter, the mobile terminal test device according to the embodiment of the present invention will be described in detail with reference to the drawings.

Figure 1:
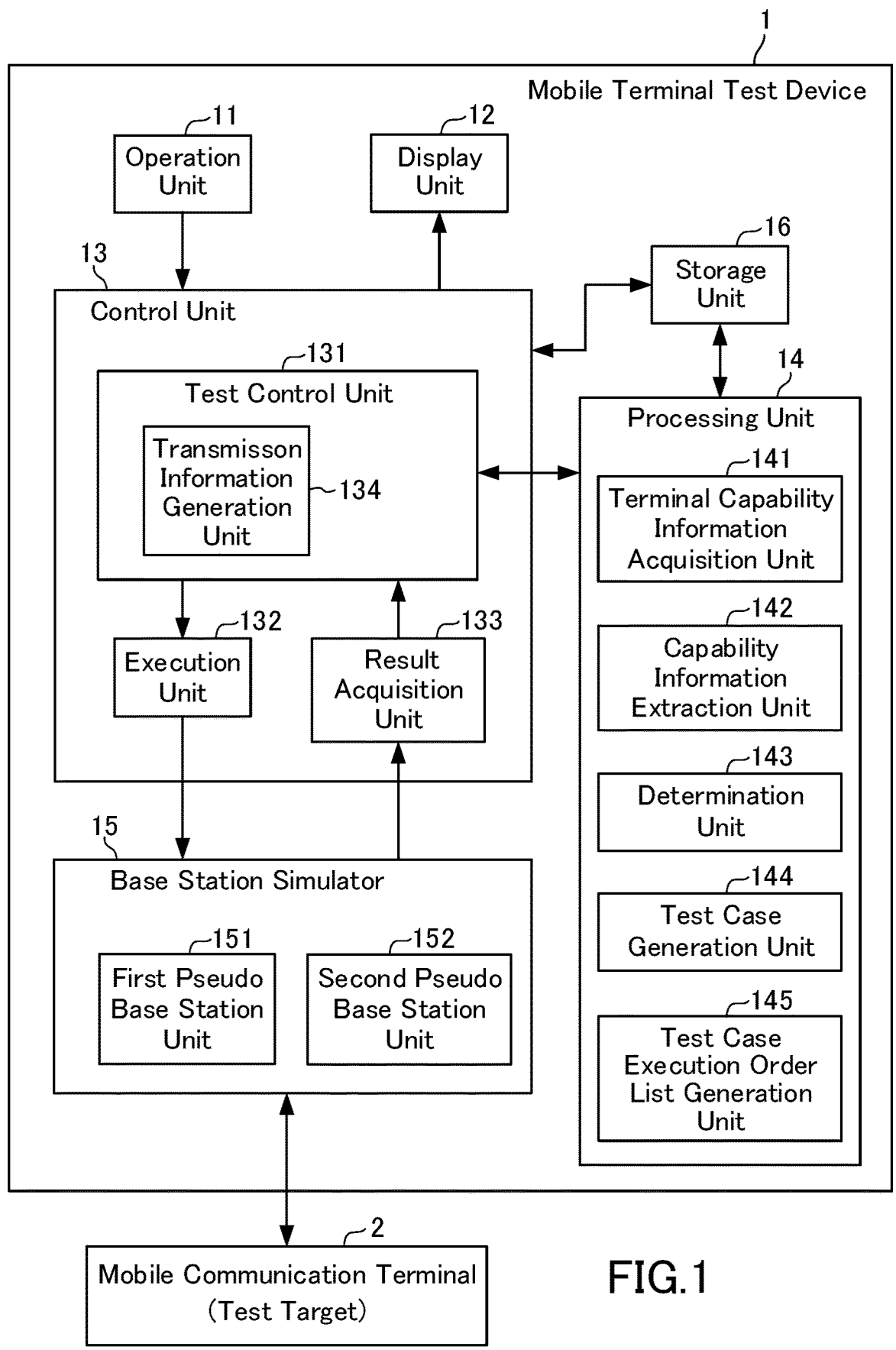
FIG. 1 is a block diagram showing a configuration of a mobile terminal test device according to an embodiment of the present invention.

FIG. 1 is a block diagram showing the configuration of the mobile terminal test device 1 according to the present embodiment. The mobile terminal test device 1 tests the mobile communication terminal 2 by simulating a mobile communication base station according to a test case. As shown in FIG. 1, the mobile terminal test device 1 is provided with an operation unit 11, a display unit 12, a control unit 13, a preparation unit 14, a base station simulator 15, and a storage unit 16. Hereinafter, each component will be described.

The operation unit 11 is provided with an input device such as a keyboard, a mouse, and a touch panel, and outputs, for example, instruction information to the mobile terminal test device 1 that is operated and inputted by the user to the control unit 13. For example, the user may operate the operation unit 11 to select the type of test to be performed (throughput test, cell mobility test, and the like).

The display unit 12 is provided with an image display device such as a liquid crystal display, and displays a list of test case execution order generated by the preparation unit 14, test result of the test case, various states during the test, and the like. Further, the display unit 12 may display correct/wrong information of a terminal capability information of the mobile communication terminal 2, determined by a determination unit 143 to be described later.

The control unit 13 executes test cases and evaluates the execution results, and the like, and is provided with a test control unit 131, an execution unit 132, and a result acquisition unit 133.

The test control unit 131 controls the execution of test cases based on the test cases generated by the preparation unit 14 and the list of execution order thereof (test case execution order list) and evaluates the execution results of the test cases. Evaluation is conducted based on evaluation criteria established for each test case.

The test control unit 131 is provided with a transmission information generation unit 134 that generates transmission information to be transmitted from the first pseudo base station unit 151 and the second pseudo base station unit 152 through the execution unit 132 based on the test case information. To be specific, the transmission information generation unit 134 generates notification information of the first pseudo base station unit 151 and the second pseudo base station unit 152, transmission information in the location registration process, and the like based on the information of the test case. For example, the transmission information generation unit 134 generates notification information based on the setting information of the operation of the base station simulated by each of the first pseudo base station unit 151 and the second pseudo base station unit 152, which are individually set.

The execution unit 132 transmits instruction information such as transmission information and setting information to the base station simulator 15 based on the information of the test cases and the test case execution order list stored in the storage unit 16 under the control of the test control unit 131 and executes the test by having the base station simulator 15 and the mobile communication terminal 2 communicate with each other.

The result acquisition unit 133 acquires information on the result of the communication between the base station simulator 15 and the mobile communication terminal 2 from the base station simulator 15 and transmits the information to the test control unit 131.

The execution unit 132 reads out necessary information (scenario) such as a test case and a test case execution order list stored in the storage unit 16 according to an instruction from the test control unit 131, and based on the information, have the first pseudo base station unit 151 and the second pseudo base station unit 152 transmit the notification information and execute a communication sequence with the mobile communication terminal 2.

The base station simulator 15 receives an instruction from the execution unit 132 and performs communication with the mobile communication terminal 2 by simulating the base station, and is provided with the first pseudo base station unit 151 and the second pseudo base station unit 152. The first pseudo base station unit 151 and the second pseudo base station unit 152 are designed to simulate a base station that operates according to a 5G NR communication standard or a 4G (LTE or LTE-A) communication standard. Hereinafter, "5G NW" may be simply referred to as NR, and "LTE or LTE-A" will be simply referred to as LTE. The base station simulator 15 of the present embodiment has two pseudo base station units, but may be one or three or more depending on the content of the test.

The signals transmitted by the first pseudo base station unit 151 and the second pseudo base station unit 152 are combined by a coupler (not shown) and transmitted to the mobile communication terminal 2. Further, the signal received from the mobile communication terminal 2 is transmitted to each of the first pseudo base station unit 151 and the second pseudo base station unit 152 through the coupler.

The storage unit 16 is constituted by a hard disk device, a flash memory, or the like, and stores test case information, test case execution order list information, test result information of each test case, and the like, generated by the preparation unit 14.

Next, the preparation unit 14 will be described.

Hereinafter, description will be made based on an assumption that the mobile communication terminal 2 is compatible with the 5G NR communication method, but the communication method is not limited to this.

As shown in FIG. 1, the preparation unit 14 generates data and information required for performing a test, and is provided with a terminal capability acquisition unit 141, a capability information extraction unit 142, a determination unit 143, a test case generation unit 144, and a test case execution order list generation unit 145.

The terminal capability information acquisition unit 141 is adapted to acquire terminal capability information indicating the ability, performance, or function supported by the mobile communication terminal 2 by communicating with the mobile communication terminal 2. To be specific, the terminal capability information acquisition unit 141 acquires, for example, the UE Capability Information installed in the mobile communication terminal 2. The terminal capability information acquisition unit 141 constitutes the acquisition unit of the present invention.

The capability information extraction unit 142 extracts the first capability information related to the 5G NR communication method and the second capability information related to the LTE communication method from the terminal capability information, respectively. To be specific, the capability information extraction unit 142 extracts capability information related to setting values (parameter setting values) that can be set to test parameters such as carrier aggregation configuration, frequency band, bandwidth, and MIMO in each of 5G NR and LTE, for example from UE Capability Information. The capability information extraction unit 142 constitutes the extraction unit of the present invention.

The determination unit 143 determines whether or not the terminal capability information of the mobile communication terminal 2 is correct, based on whether or not at least one of the first ability information and the second ability information extracted by the ability information extraction unit 142 conforms to a predetermined criterion. To be specific, the determination unit 143 analyzes the first capability information and the second capability information extracted by the capability information extraction unit 142 from the viewpoint of the conformance to the communication standards (criteria) of 5G NR and LTE, and if there is a part that does not conform to the criteria, determines that the terminal capability information of that part is incorrect. For example, conditions to be satisfied in terms of communication standards, such as possible values of test parameters and their ranges, may be set in advance and used as a criterion for the determination.

The test case generation unit 144 is adapted to automatically generate a test case by combining a combination 210 of parameter setting values set in the test parameters in the 5G NR communication method and a combination 220 of parameter setting values set in the test parameters in LTE communication method based on the first capability information and the second capability information. The test case generation unit 144 constitutes the generation unit of the present invention.

Further, the test case generation unit 144 further generates a test case as a combination 210 of parameter setting values set in the test parameters in the 5G NR communication method based on the first capability information.

To be specific, the test case generator 144 generates a test case as a combination 210 of parameter setting values in the 5G NR communication method, based on information on major test parameters (first capability information) such as frequency band, bandwidth, carrier aggregation configuration, and MIMO related to the 5G NR communication method. This test case can be used for a 5G NR stand-alone test.

The test case execution order list generation unit 145 generates a list of execution order of the test cases generated by the test case generation unit 144. The test case execution order list generation unit 145 constitutes the list generation unit of the present invention.

Here, the mobile terminal test device 1 is constituted by a computer device (not shown) provided with a communication module for communicating with the mobile communication terminal 2. This computer device is provided with a CPU (Central Processing Unit) (not shown), a ROM (Read Only Memory), a RAM (Random Access Memory), a hard disk device, an input/output port, and a touch panel.

A program for making the computer device function as the mobile terminal test device 1 is stored in the ROM and the hard disk device of this computer device. This means that when the CPU executes the program stored in the ROM with the RAM as the work area, the computer device functions as the mobile terminal test device 1.

Thus, in the present embodiment, the storage unit 16 is constituted by a RAM or a hard disk device, the control unit 13 and the preparation unit 14 are constituted by a CPU, and the base station simulator 15 is constituted by a communication module. The base station simulator 15 may be configured as a device distinct from the computer devices constituting the control unit 13, the preparation unit 14, and the like.

Next, processing of the mobile terminal test device 1 will be described by taking a throughput test as an example.

The throughput test is a communication speed test, and specifically, is a test for examining whether or not the mobile communication terminal 2 satisfies the specification value of the communication speed.

Figure 2:
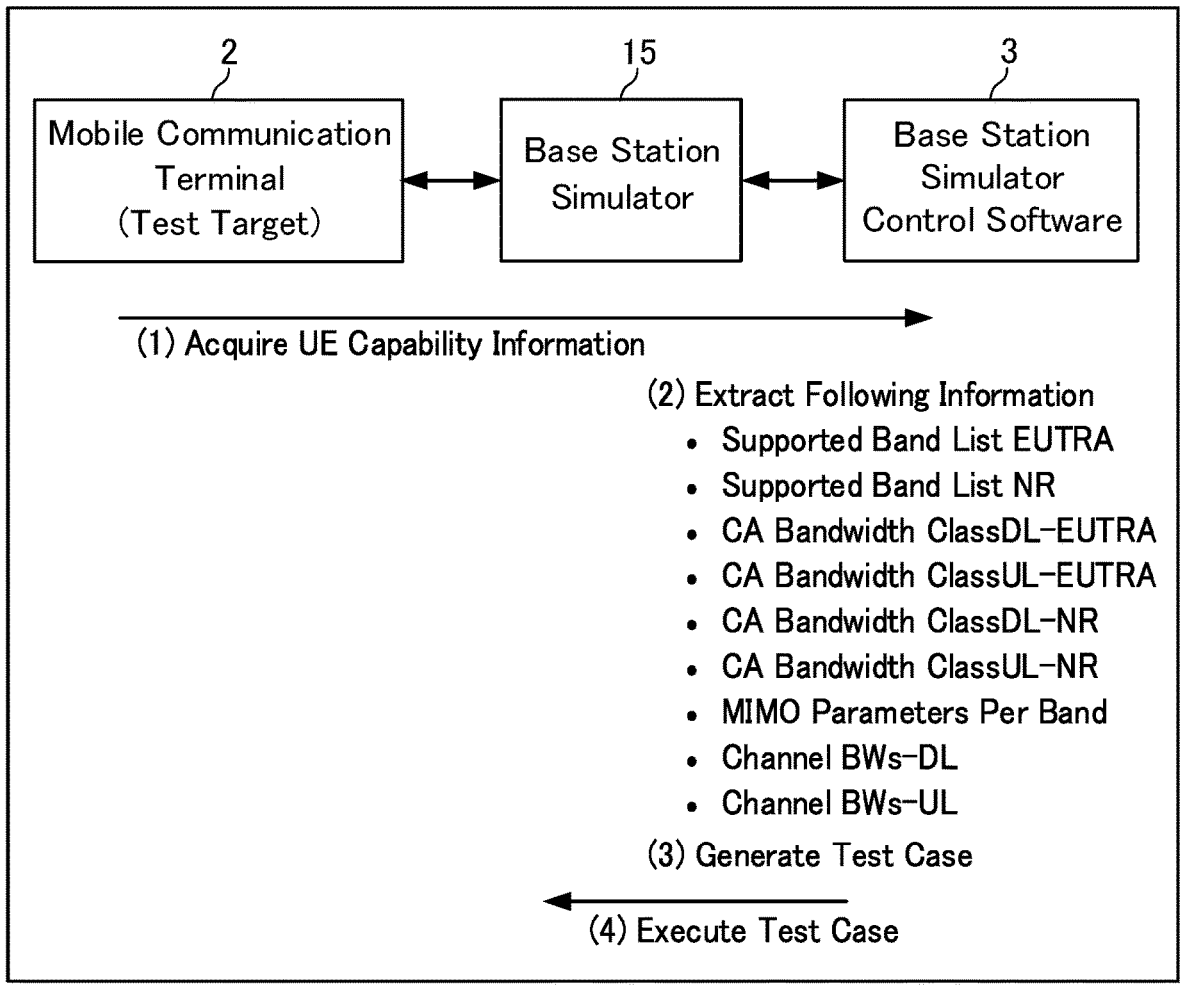
FIG. 2 is a figure showing a processing flow of the mobile terminal test device according to an embodiment of the present invention.

FIG. 2 is a figure showing a processing flow of the mobile terminal test device 1 according to the present embodiment. As shown in FIG. 2, the terminal capability information acquisition unit 141 of the preparation unit 14 acquires the UE Capability Information (terminal capability information) received from the mobile communication terminal 2 through the base station simulator 15 under control of the control unit 13. The acquired UE Capability Information is stored in the RAM or the storage unit 16 of the computer device.

The UE Capability Information includes UE-NR-Capability and UE-MRDC-Capability. The UE-NR-Capability is UE Capability in 5G NR stand-alone mode. The UE-MRDC-Capability is UE Capability in 5G NR non-standalone mode, and the UE-MRDC-Capability includes a definition of the supportedBandList of the LTE carrier wave and 5G NR carrier wave. These are specified in TS 38.306, TS 38.331, and the like.

Functions of the control unit 13 and the preparation unit 14 can be implemented by executing the base station simulator control software 3 on a CPU of a computing device.

The capability information extraction unit 142 of the preparation unit 14 extracts information (capability information) related to the throughput test from the UE Capability Information stored in the RAM or the storage unit 16 for each of the 5G NR and LTE. The extracted capability information is stored in the RAM or the storage unit 16 of the computer device.

Examples of the capability information include supportedBandListEUTRA, supportedBandListNR, ca-BandwidthClassDL-EUTRA, ca-BandwidthClassUL-EUTRA, ca-BandwidthClassDL-NR, ca-BandwidthClassUL-NR, MIMO-ParametersPerBand, channelBWs-DL, and channelBWs-UL and the like. It should be noted that similar information may be defined with a different name.

supportedBandListNR and MIMO-ParametersPerBand are information on the frequency bands supported by the mobile communication terminal 2 and information on the MIMO order of each frequency band. These are specified in TS 38.101-1, TS 38.101-2, and the like.

supportedBandListEUTRA is information on the 4G frequency band used during NSA supported by the mobile communication terminal 2. Further, MeasAndMobParameters can be obtained as Measurement information related to mobility, supported by the mobile communication terminal 2. These are specified in TS 38.306 and the like.

ca-BandwidthClassDL-EUTRA, ca-BandwidthClassUL-EUTRA, ca-BandwidthClassDL-NR, and ca-BandwidthClassUL-NR are information related to combinations of frequency bands in SA mode and NSA mode supported by the mobile communication terminal 2, and bandwidth of each carrier wave. These are specified in TS 38.101-1, TS 38.101-2, and the like.

channelBWs-DL and channelBWs-UL are information on the subcarrier spacing of the carrier wave in the SA mode supported by the mobile communication terminal 2. These are specified in TS 38.101-1, TS 38.101-2, and the like.

Next, the test case generation unit 144 of the preparation unit 14 generates a test case that is a combination of parameter setting values set in the test parameters related to throughput based on the capability information extracted by the capability information extraction unit 142. The parameter setting value refers to a set value of a test parameter (for example, frequency band, bandwidth, carrier aggregation configuration, MIMO antenna configuration, and the like) that gives test conditions (operating conditions of a cell or a pseudo base station). The generated test case is stored in the storage unit 16.

Next, the test case execution order list generation unit 145 generates a list of test cases in execution order (a test case execution order list) based on the generated test cases. The test case execution order list is stored in the storage unit 16.

The execution unit 132 executes the test cases in order according to the test case execution order list under the control of the test control unit 131. To be specific, the execution unit 132 sets the functions of the first pseudo base station unit 151 and the second pseudo base station unit 152 of the base station simulator 15 based on each test case, and have the pseudo base station units 151, 152 communicate with the mobile communication terminal 2.

The result acquisition unit 133 acquires the result of communication between the base station simulator 15 and the mobile communication terminal 2 and sends the result to the test control unit 131. The test control unit 131 analyzes the communication result sent from the result acquisition unit 133, and evaluates the result of the throughput test based on a predetermined criteria. For example, the communication result is evaluated based on whether or not the communication speed of the mobile communication terminal 2 has reached a predetermined reference communication speed.

Figure 5:
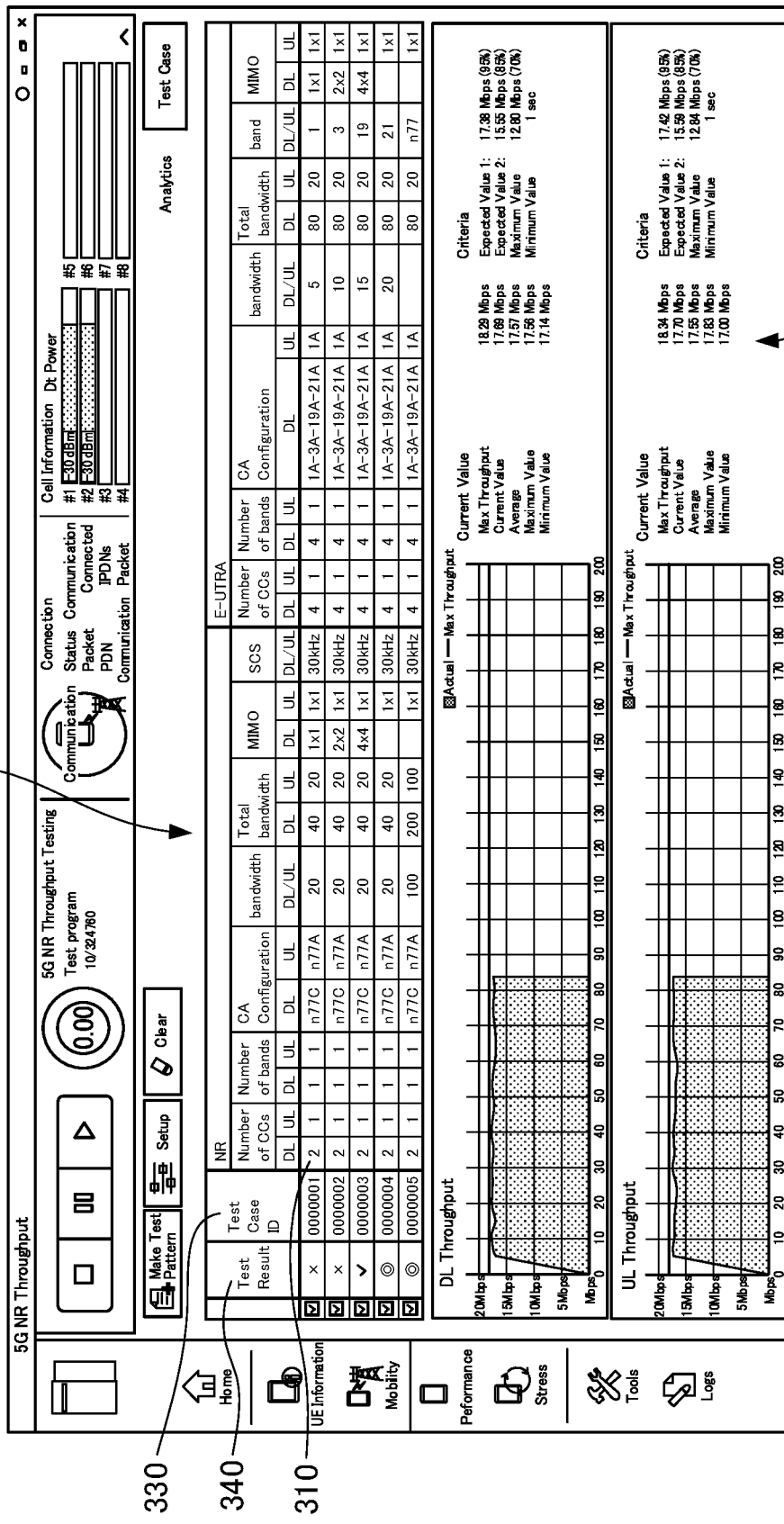
FIG. 5 is a figure showing an example of a display image of a display unit at the time of a throughput test of the mobile terminal test device according to an embodiment of the present invention.

FIG. 5 shows an example of a display image of the display unit 12 during the throughput test. As shown in FIG. 5, the display unit 12 displays the test case execution order list 320 in which the test cases 310 are arranged in the execution order, and displays the execution result 340 of each test case side by side with the test case 310 in real time. Each line in the test case execution order list 320 corresponds to one test case. An identification number 330 is assigned to each test case 310, and the identification number 330 is displayed adjacent to the test case 310. In addition, the display unit 12 also displays information such as a graph 350 of the measured throughput and a throughput evaluation 360 based on a criteria.

FIG. 3 shows an example of a combination (test case) of parameter setting values set in the test parameters in the throughput test by the mobile terminal test device 1. In FIG. 3, the test case is shown as a combination 230 of a combination 210 of parameter setting values set for test parameters in 5G NR and a combination 220 of parameter setting values set for test parameters in LTE. In other words, the combination of parameter setting values 210 defines the operating conditions of the 5G NR cell, and the combination 220 of the parameter setting values defines the operating conditions of the LTE cell. This means that, FIG. 3 shows a test case of a throughput test in the case of 5G NR non-standalone mode. Each line in FIG. 3 corresponds to one test case.

In the throughput test in the case of the 5G NR standalone mode, the combination 210 of the parameter setting values set in the test parameters in the 5G NR is used as a test case.

In the throughput test in the case of the LTE cell, the combination 220 of the parameter setting values set in the test parameters in LTE is used as a test case.

As the test parameters that constitute the test case, the number of CCs, the number of frequency bands, the carrier aggregation configuration, the bandwidth, the total bandwidth, MIMO, and the subcarrier interval (SCS) are used for 5G NR. For LTE (E-UTRA (Evolved Universal Terrestrial Radio Access)), the number of CCs, the number of frequency bands, carrier aggregation configuration, bandwidth, total bandwidth, frequency band, and MIMO configuration are used as test parameters. For each test parameter, parameter setting values are set for each of the downlink (DL) and the uplink (UL).

Next, the cell mobility test will be described.

The cell mobility test is a test for confirming whether or not base station switching (handover) can be performed appropriately.

The processing operation of the mobile terminal test device 1 in the cell mobility test differs from the processing operation of the mobile terminal test device 1 in the throughput test described above in the following points. First, in the capability information extraction process, the capability information extraction unit 142 extracts the capability information related to mobility. Further, in the test case generation process, the test case generation unit 144 generates a test case that is a combination of parameter setting values of test parameters related to cell mobility based on the capability information extracted by the capability information extraction unit 142. Except for these points, the basic processing operation of the mobile terminal test device 1 in the cell mobility test is the same as that in the throughput test.

FIGS. 4A and 4B show an example of parameter setting values used in the cell mobility test, FIG. 4A shows the mobility (handover) operation to be tested, and FIG. 4B shows the intra-frequency, inter-frequency, and inter-RAT mobility operations triggered by Measurement.

To be specific, as shown in FIG. 4A, examples of the mobility operation to be confirmed in the cell mobility test include the following types of handovers:

(1) Inter gNB handover from NR base station to NR base station [SA mode];

(2) Handover from an NR base station to another system (2G/3G/4G) base station [SA mode, NSA mode];

(3) Handover from NR base station to NR base station in E-UTRA-NR Dual Connectivity [NSA mode].

Further, as shown in FIG. 4B, there are an intra-frequency handover, an inter-frequency handover, and an inter-RAT handover as mobility operations performed by the Measurement as a trigger. These mobility operations are executed, for example, triggered by each Event that occurs when the measurement result described in parentheses after each Event in the figure is obtained.

The items listed in FIGS. 4A and 4B are the test parameters of the cell mobility test, and the items supported by the mobile communication terminal 2 are used as the parameter setting values of the cell mobility test.

In addition to the test parameters, the test parameters of the cell mobility test include the test parameters of the throughput test described above (frequency band, bandwidth, carrier aggregation configuration, MIMO configuration, and the like). This means that the combination of the parameter setting values of the cell mobility test (test case) is constituted as a combination of the combination of the parameter setting values of the throughput test shown in FIG. 3 and the combination of the parameter setting values related to mobility shown in FIGS. 4A and 4B.

In the above description, each test such as the throughput test or the cell mobility test is executed individually, but a plurality of tests may be continuously executed in sequence.

Figure 6:
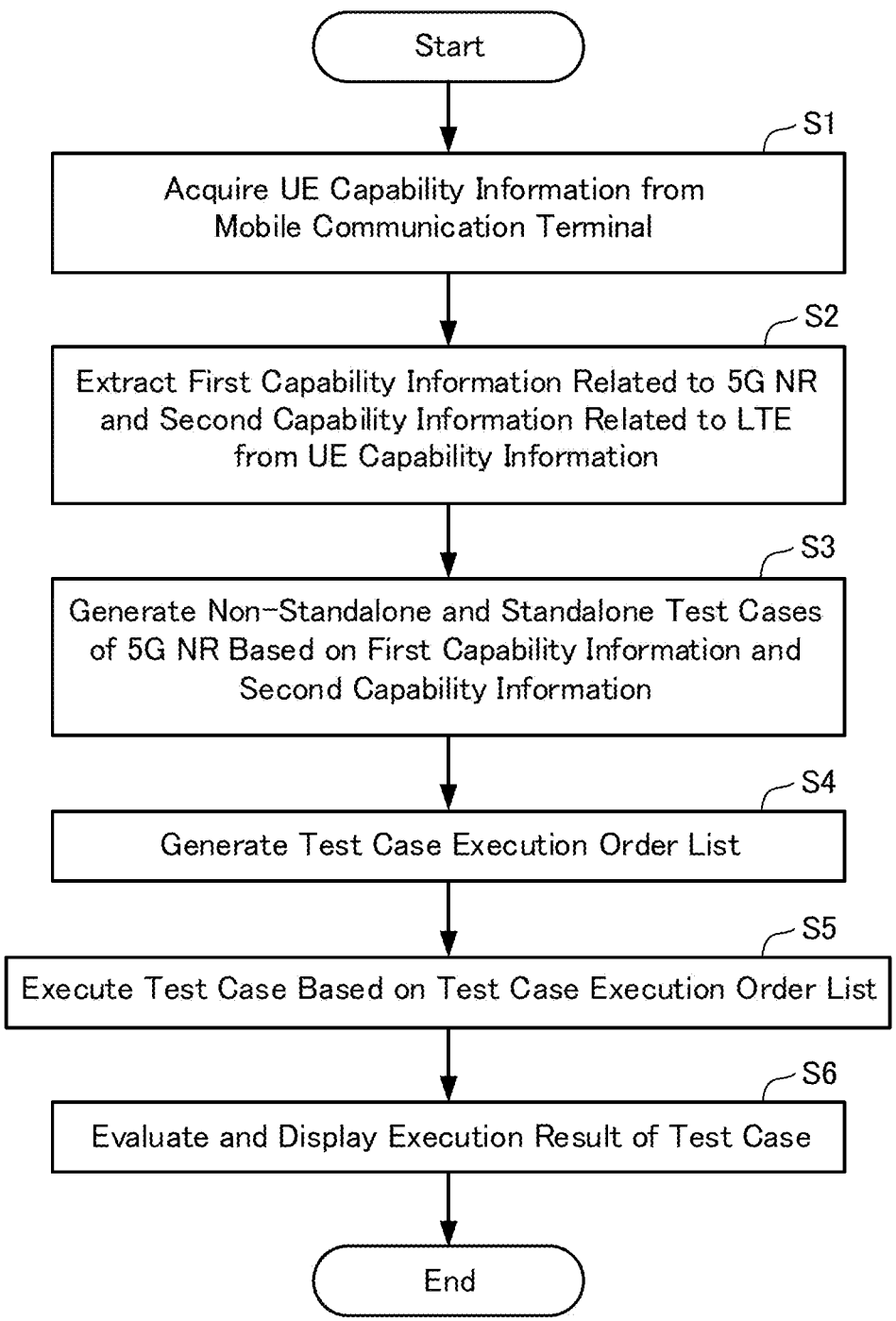
FIG. 6 is a flowchart showing a procedure of a mobile terminal test method according to an embodiment of the present invention.

Next, the mobile terminal test method will be described by taking a throughput test as an example with reference to FIG. 6. FIG. 6 is a flowchart showing the procedure of the mobile terminal test method.

First, the user connects the mobile terminal test device 1 and the mobile communication terminal 2 by wire or wirelessly, and causes the mobile communication terminal 2 to perform location registration by turning on the power of the mobile communication terminal 2.

When the result acquisition unit 133 receives the UE Capability from the mobile communication terminal 2 during the location registration sequence, the result acquisition unit 133 transmits the contents to the test control unit 131. Not limited to the information at the time of location registration, the execution unit 132 may request the mobile communication terminal 2 to transmit the UE Capability through the base station simulator 15 at the request of the test control unit 131, and the result acquisition unit 133 may transmit the received UE Capability to the test control unit 131.

When the test control unit 131 receives the UE Capability from the result acquisition unit 133, the terminal capability information acquisition unit 141 acquires the UE Capability Information of the mobile communication terminal 2 from the test control unit 131 (step S1).

Next, the capability information extraction unit 142 extracts supportedBandListEUTRA, supportedBandListNR, ca-BandwidthClassDL-EUTRA, ca-BandwidthClassUL-EUTRA, ca-BandwidthClassDL-NR, ca-BandwidthClassUL-NR, MIMO-ParametersPerBand, channelBWs-DL, and channel BWs-UL, which are throughput-related capability information, from UE Capability Information (step S2).

To be specific, the capability information extraction unit 142 extracts the first capability information related to the 5G NR wireless communication method and the second capability information related to the LTE wireless communication method from the UE Capability Information, respectively. To be more specific, the capability information extraction unit 142 extracts information on possible parameter setting values of test parameters such as carrier aggregation, frequency band, bandwidth, and MIMO for each of the 5G NR wireless communication method and the LTE wireless communication method.

In other words, the first capability information extracted by the capability information extraction unit 142 is information on the parameter setting values that can be taken when the 5G NR wireless communication method is operated standalone. And, the first capability information and the second capability information are information on parameter setting values that can be taken when the 5G NR wireless communication method is operated non-standalone.

Next, the test case generation unit 144 automatically generates test cases for 5G NR wireless communication method being operated standalone or EN-DC (LTE/LTE/dual connectivity) and test cases for 5G NR wireless communication method being operated standalone, based on the first capability information and the second capability information extracted in step S2 (step S3).

The combination of test parameters that constitute the test case varies depending on the type of test. For example, in the cell mobility test, the type of handover supported by the mobile communication terminal 2 and the event that triggers the handover can be test parameters. In addition, the combination of test parameters that constitute the test case varies depending on the operation mode of the 5G NR wireless communication method. For example, in FIG. 3, in the case of standalone, a test case is constituted by a combination 210 of test parameters related to 5G NR, and in the case of non-standalone, a test case is constituted by a combination 230, which is a combination 210 of test parameters related to 5G NR and a combination 220 of test parameters related to LTE.

The type of the test is selected by the user by operating the operation unit 11.

Next, the test case execution order list generation unit 145 generates a test case execution order list based on the test cases generated in step S3 (step S4).

Next, the execution unit 132 executes the test cases in order according to the test case execution order list (step S5).

The result acquisition unit 133 receives the execution result of each test case from the base station simulator 15 and outputs it to the test control unit 131. The test control unit 131 evaluates the execution result of each test case based on a preset standard, displays the evaluation result on the display unit 12, and stores the evaluation result in the storage unit 16 (step S6).

As described above, in the mobile terminal test device 1 according to the present embodiment is so configured that, the capability information extraction unit 142 respectively extracts to the first capability information related to 5G NR and the second capability information related to LTE from the terminal capability information of the mobile communication terminal 2, and the test case generation unit 144 generates the test case as the combination 230 of the combination 210 of the parameter setting values set as the test parameters in the 5G NR communication method and the combination 220 of the parameter setting values set as the test parameters in the LTE communication method, based on the first capability information and the second capability information. By this configuration, all test cases can be easily generated without omissions for various types of tests in the operation mode (non-standalone) that uses a combination of 5G NR communication method and LTE communication method, so that various types of tests can be performed quickly and reliably at low cost.

Further, in the mobile terminal test device 1 according to the present embodiment, the test case generation unit 144 generates a test case as a combination 210 of parameter setting values set as test parameters in the 5G NR communication method, based on the first capability information. By this configuration, the mobile terminal test device 1 according to the present embodiment can easily generate all the test cases without omissions for various types of tests, even in an operation mode (stand-alone) in which control and data transmission/reception between a base station and a mobile communication terminal are performed by the 5G NR communication method alone.

As described above, the present invention has an effect that test cases for the test of the mobile communication terminal supporting 5G NR can be easily generated without omissions and that various type of operation tests can be performed quickly and reliably at low cost, and is useful for mobile terminal test devices and mobile terminal test methods in general.

EXPLANATION OF REFERENCE NUMERALS

1, Mobile Terminal Test Device
2. Mobile Communication Terminal (Test Target)
3 Base Station Simulator Control Software
11 Operation Unit
12 Display Unit
13 Control Unit
   131 Test Control Unit
   132 Execution Unit
   133 Result Acquisition Unit
   134 Transmission Information Generation Unit
14 Preparation Unit
   141 Terminal Capability Information Acquisition Unit (Acquisition Unit)
   142 Capability Information Extraction Unit (Extraction Unit)
   143 Determination Unit
   144 Test Case Generation Unit (Generation Unit)
   145 Test Case Execution Order List Generation Unit (List Generation Unit)
15 Base Station Simulator
   151 First Pseudo Base Station Unit
   152 Second Pseudo Base Station Unit
16 Storage Unit
210 Combination of Parameter Setting Values (5G NR Standalone)
220 Combination of Parameter Setting Values (LTE)
230 Combination of Parameter Setting Values (5G NR Non-Standalone)
310 Test Case
320 Test Case Execution Order List
330 Identification Number
340 Test Case Execution Result
350 Graph of Throughput
360 Evaluation of Throughput

What is claimed is:

1. A mobile terminal test device that tests a mobile communication terminal by simulating a mobile communication base station, the mobile terminal test device comprising:
an acquisition unit that, in a preparation phase, acquires terminal capability information, which is information related to a capability of the mobile communication terminal, by communicating with the mobile communication terminal;
an extraction unit that, in preparation phase, extracts first capability information related to a first wireless communication method from the terminal capability information and extracts second capability information related to a second wireless communication method from the terminal capability information;
a generation unit that, in the preparation phase, generates a test case as a combination of: the combination of parameter setting values to be set in test parameters in the first wireless communication method, based on the first capability information; and a combination of parameter setting values to be set in test parameters in the second wireless communication method based on the second capability information; and
a control unit that executes the test case and evaluates results of the executed test case,
wherein the mobile terminal test device further comprises a determination unit that, in the preparation phase, determines whether or not the terminal capability information of the mobile communication terminal is correct, based on whether or not at least one of the first capability information and the second capability information extracted by the extraction unit conforms to a predetermined criterion.

2. The mobile terminal test device according to claim 1, further provided with
a list generation unit that generates a list of execution order of the test cases generated by the generation unit, and
a display unit that displays the list together with execution result of the test cases.

3. The mobile terminal test device according to claim 1, wherein either one of the first capability information or the second capability information extracted by the extraction unit includes capability information related to throughput, and the test case generated by the generation unit includes parameter setting values to be set in test parameters related to throughput.

4. The mobile terminal test device according to claim 1, wherein either one of the first capability information or the second capability information extracted by the extraction unit includes capability information related to mobility, and the test case generated by the generation unit includes parameter setting values to be set in test parameters related to mobility.

5. The mobile terminal test device according to claim 1, wherein the first wireless communication method is 5G NR (New Radio) communication method, and the second wireless communication method is LTE (Long Term Evolution) or LTE-A (Long Term Evolution Advanced) communication method.

6. A mobile terminal test method to test a mobile communication terminal by simulating a mobile communication base station, the mobile terminal test method comprising:
an acquisition step to acquire terminal capability information, which is information related to a capability of the mobile communication terminal, by communicating with the mobile communication terminal;
an extraction step to respectively extract first capability information related to a first wireless communication method and second capability information related to a second wireless communication method, from the terminal capability information;
a generation step to generate a test case as a combination of a combination of parameter setting values to be set in test parameters in the first wireless communication method and a combination of parameter setting values to be set in test parameters in the second wireless communication method, based on the first capability information and the second capability information;
an execution step to sequentially execute the test cases; and
an evaluation step to evaluate results of the executed test cases, wherein the mobile terminal test device further comprises
a determination step, in the preparation phase, to determine whether or not the terminal capability information of the mobile communication terminal is correct, based on whether or not at least one of the first capability information and the second capability information extracted by the extraction step conforms to a predetermined criterion.

7. A mobile terminal test device that tests a mobile communication terminal by simulating a mobile communication base station, the mobile terminal test device comprising:
a preparation unit that prepares a test; and
a control unit that executes the test case and evaluates the execution results; and
a base station simulator that performs communication with the mobile communication terminal by simulating the mobile communication base station,
wherein the preparation unit comprises:
an acquisition unit that, in a preparation phase, acquires terminal capability information, which is information related to a capability of the mobile communication terminal, by communicating with the mobile communication terminal;
an extraction unit that, in the preparation phase, extracts first capability information related to a first wireless communication method from the terminal capability information and extracts second capability information related to a second wireless communication method from the terminal capability information;
a determination unit that, in the preparation phase, determines whether or not the terminal capability information of the mobile communication terminal is correct, based on whether or not at least one of the first capability information and the second capability information extracted by the extraction unit conforms to a predetermined criterion; and
a generation unit that, in the preparation phase, generates a test case as a combination of: the combination of parameter setting values to be set in test parameters in the first wireless communication method, based on the first capability information; and
a combination of parameter setting values to be set in test parameters in the second wireless communication method based on the second capability information; and
wherein the control unit comprises:
an execution unit that executes the test case; and
a test control unit that evaluates results of the test case executed by the execution unit.

* * * * *